US012705083B2

(12) United States Patent
Tsirkin

(10) Patent No.: US 12,705,083 B2
(45) Date of Patent: Aug. 11, 2026

(54) THERMAL THROTTLING TO REGULATE VIRTUAL PROCESSING DEVICE USAGE

(71) Applicant: Red Hat, Inc., Raleigh, NC (US)

(72) Inventor: Michael Tsirkin, Ra'anana (IL)

(73) Assignee: Red Hat, Inc., Raleigh, NC (US)

(*) Notice: Subject to any disclaimer, the term of this patent is extended or adjusted under 35 U.S.C. 154(b) by 419 days.

(21) Appl. No.: 18/242,102

(22) Filed: Sep. 5, 2023

(65) Prior Publication Data

US 2025/0077253 A1 Mar. 6, 2025

(51) Int. Cl.
*G06F 9/455* (2018.01)
*G06F 9/48* (2006.01)

(52) U.S. Cl.
CPC ........ *G06F 9/45558* (2013.01); *G06F 9/4893* (2013.01); *G06F 2009/45591* (2013.01)

(58) Field of Classification Search
CPC ............... G06F 9/45558; G06F 9/4893; G06F 2009/45591
See application file for complete search history.

(56) References Cited

U.S. PATENT DOCUMENTS

| | | | | |
|---|---|---|---|---|
| 9,244,732 | B2 | 1/2016 | West et al. | |
| 9,268,394 | B2 | 2/2016 | Kansal et al. | |
| 10,496,446 | B2 | 12/2019 | Venkataraja et al. | |
| 11,281,487 | B2 | 3/2022 | Tsirkin | |
| 11,593,134 | B2 | 2/2023 | Wang | |
| 2008/0163239 | A1* | 7/2008 | Sugumar | G06F 9/45558 718/105 |
| 2010/0217454 | A1* | 8/2010 | Spiers | H05K 7/20836 713/320 |
| 2017/0109205 | A1* | 4/2017 | Ahuja | G06F 9/5094 |
| 2017/0286252 | A1* | 10/2017 | Illikkal | H04L 47/83 |
| 2017/0364387 | A1* | 12/2017 | Ahmed | G06F 3/0605 |
| 2018/0027060 | A1* | 1/2018 | Metsch | G02B 6/4292 |
| 2020/0034171 | A1* | 1/2020 | Kommula | G06F 9/4893 |
| 2022/0075638 | A1 | 3/2022 | Shukla et al. | |
| 2022/0129053 | A1* | 4/2022 | Ronnau | G06F 9/4893 |
| 2024/0289149 | A1* | 8/2024 | Mahadev | G06F 9/45558 |

OTHER PUBLICATIONS

Guarav Dhiman, et al., "vGreen: A System for Energy Efficient Computing in Virtualized Environments", Department of Computer Science and Engineering University of California, San Diego, Aug. 2009, 6 pages.

Philip M. Wells, et al., "Hardware Support for Spin Management in Overcommitted Virtual Machines", Computer Sciences Department University of Wisconsin, Madison, Sep. 2006, 10 pages.

Christoph Klee, "Transparent, Thermal Balancing of Virtual Machines in Multicore Systems", Karlsruhe Institute of Technology, Oct. 2007, 42 pages.

* cited by examiner

*Primary Examiner* — Dong U Kim
(74) *Attorney, Agent, or Firm* — Kilpatrick Townsend & Stockton LLP

(57) ABSTRACT

Systems, methods, and apparatuses for regulating virtual processing device usage by emulating thermal throttling are provided herein. An example method comprises limiting a processing capacity allocated for a virtual processing device to a value equal to or below a threshold by transmitting, via a hypervisor, an indication to a guest that the virtual processing device has exceeded an operating temperature, wherein the value is below a current processing capacity of a host processing device.

15 Claims, 4 Drawing Sheets

THERMAL THROTTLING TO REGULATE VIRTUAL PROCESSING DEVICE USAGE

BACKGROUND

Virtual machines typically execute under the supervision of a hypervisor, which may emulate hardware to create a virtual system on which a virtual machine runs. One piece of hardware that is often emulated by a hypervisor is a processing device, the execution of which can be replicated virtually to create a virtual processing device (i.e. a VCPU). The virtual machine may then interact with the virtual processing device as if the virtual processing device was a physical processing device, with the hypervisor taking appropriate actions to ensure that the virtual processing device executes as expected.

SUMMARY

Systems, methods, and apparatuses are provided for regulating virtual processing device usage by emulating thermal throttling. In an example, a method comprises limiting a processing capacity allocated for a virtual processing device to a value equal to or below a threshold by transmitting, via a hypervisor, an indication to a guest that the virtual processing device has exceeded an operating temperature, wherein the value is below a current processing capacity of a host processing device.

In another example, a system comprises a memory and a processing device, operatively coupled to the memory to limit a processing capacity allocated for a virtual processing device to a value equal to or below a threshold by transmitting, via a hypervisor, an indication to a guest that the virtual processing device has exceeded an operating temperature, wherein the value is below a current processing capacity of a host processing device.

In yet another example, a non-transitory computer-readable medium contains instructions which, when executed by a processing device, cause the processing device to limit a processing capacity allocated for a virtual processing device to a value equal to or below a threshold by transmitting, via a hypervisor, an indication to a guest that the virtual processing device has exceeded an operating temperature, wherein the value is below a current processing capacity of a host processing device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein.

DETAILED DESCRIPTION

Figure 1:
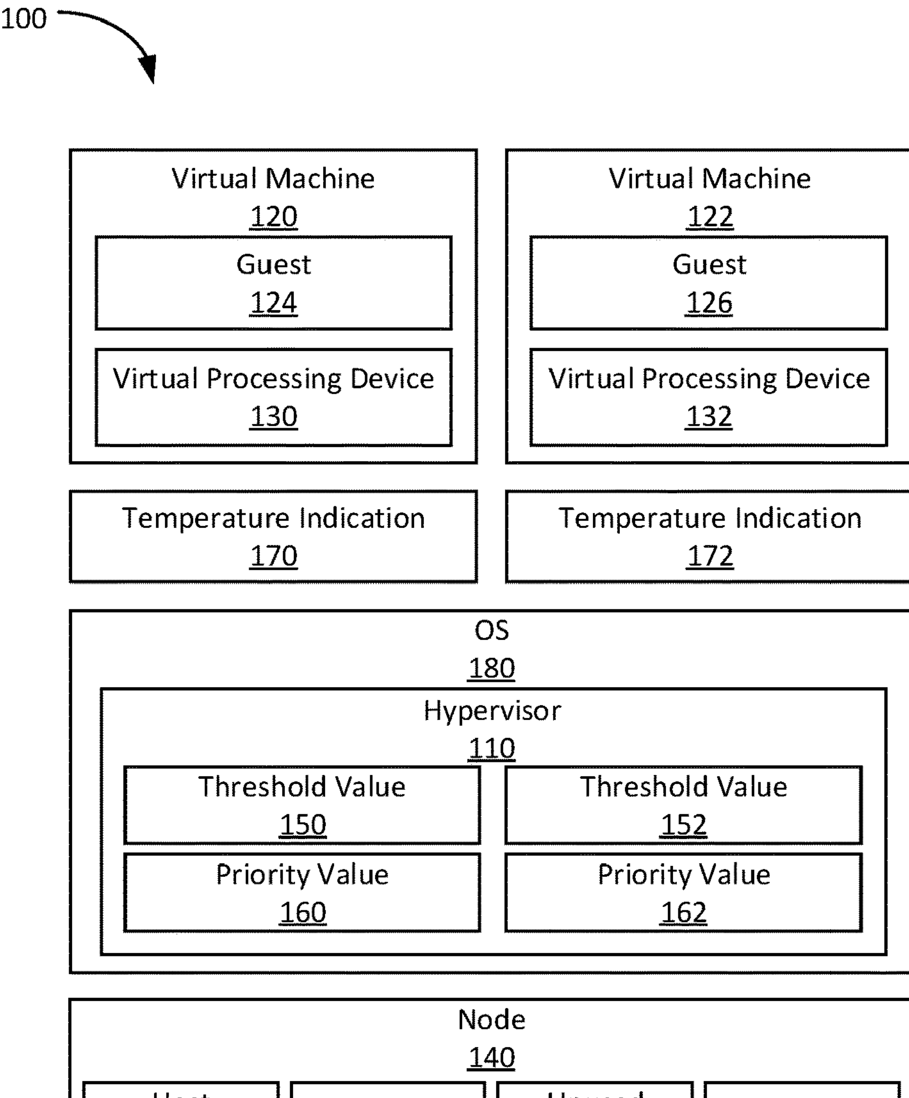
FIG. 1 illustrates an example virtualized cloud computing environment, according to example embodiments of the present disclosure.

Techniques are disclosed herein for regulating virtual processing device usage by emulating thermal throttling. A guest operating system is often unaware that an environment in which the guest operating system is executing is virtualized. Multiple guests may simultaneously execute on a host, and this can cause problems when a quantity of processing capacity demanded by a sum of the guest operating systems exceeds a processing capacity of a host processing device. This problem is commonly known as processing device overcommit. Existing methods typically focus on preventing situations outright in which processing device overcommit could occur by limiting a number of virtual machines or emulating slower virtual processing devices, but this can result in wasted processing capacity and thus reduced productivity of a system. Existing hypervisors also typically attempt to expose guest operating systems to host hardware as much as possible in order to achieve maximum performance.

One other possible solution to preventing processing device overcommit is simply allocating a certain processing rate to each guest operating system in a hypervisor, essentially slowing the processing rate of each individual virtual processing device associated with the respective guest operating systems. This solution introduces new major issues, however. Many guest operating systems execute processes that require specific timing, which can be disrupted by a slowing of the virtual processing device without compensatory measures from the guest operating system. Such compensatory measures would require the guest operating system to be aware that the virtual processing device is being slowed, however, which would often require modification of guest operating systems that aren't specifically designed to run in virtualized environments. Modification of an operating system is a complex and time-consuming task, so it will easily be appreciated that it is desirable to instead find a solution that does not require modification of a guest operating system.

Physical processing devices have a maximum safe operating temperature which cannot be exceeded without risking damage to the processing device. When a physical processing device approaches the maximum safe operating temperature, device firmware typically intervenes to slow a processing rate of the physical processing device in order to allow a greater cooling time in between clock cycles, thus maintaining or lowering a temperature of the physical processing device. This is called thermal throttling, and most operating systems are configured to handle thermal throttling, where the device firmware typically notifies the operating system that the physical processing device is operating at too high a temperature and indicates a degree to which processing rate is being reduced. The operating system then implements compensatory measures to prevent the reduced processing rate from disrupting timing-dependent processes.

Methods, systems, and apparatuses of the present disclosure advantageously regulate a processing rate of a virtual processing device executing a guest operating system without requiring modification of the guest operating system or disrupting timing-dependent processes. By emulating a physical processing device that is undergoing thermal throttling, a virtual processing device can be rate-limited for the purpose of preventing processing device overcommit without disrupting timing-dependent processes. This characteristic can be exploited for multiple processing devices at once, with emulated temperatures being chosen by a hypervisor in such a way as to prioritize certain virtual processing devices and deprioritize others. Emulating thermal throttling also avoids paravirtualization, and thus does not require the guest operating system to be paravirtualization-aware.

For example, given a host processing device frequency F and processing device allocation for a virtual processing device C, the guest operating system can notified via an event (i.e. an acpi event) indicating that the virtual processing device has overheated and processing device frequency has been reduced to a lower value F*C. A guest scheduler will now react by moving tasks away from the throttled virtual processing device to other virtual processing devices, reducing pressure on the host processing device.

FIG. 1 illustrates an example virtualized cloud computing environment 100, according to example embodiments of the present disclosure. A node 140 includes a host processing device 142 operatively coupled to a host memory 144. The host processing device 142 has an unused capacity threshold 146 indicative of a quantity of unused processing capacity below which rate-limiting of virtual processing devices will occur. The node 140 also stores a lookup table 148 containing temperatures corresponding to various reductions in processing rate for one or more types of processing device.

An operating system 180 (OS 180) executes on the node 140, and a hypervisor 110 executes on the OS 180. A first virtual machine 120 with a first guest operating system 124 (first guest 124) executes on a first virtual processing device 130 created and managed by the hypervisor 110. A second virtual machine 122 with a second guest operating system 126 (second guest 126) likewise executes on a second virtual processing device 132 created and managed by the hypervisor 110. The hypervisor 110 sends a first temperature indication 170 to the first guest 124 and a second temperature indication 172 to the second guest 126. The first temperature indication 170 is based upon a first priority value 160 for the first virtual machine 120 and a first threshold value 150 indicative of a target first virtual processing device 130 processing rate. The second temperature indication 172 is based upon a second priority value 162 for the second virtual machine 122 and a second threshold value 152 indicative of a target second virtual processing device 132 processing rate.

Figure 2:
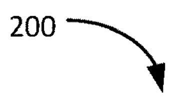
FIG. 2 illustrates a flowchart of an example method for regulating virtual processing device usage, according to example embodiments of the present disclosure.
Figure 2:
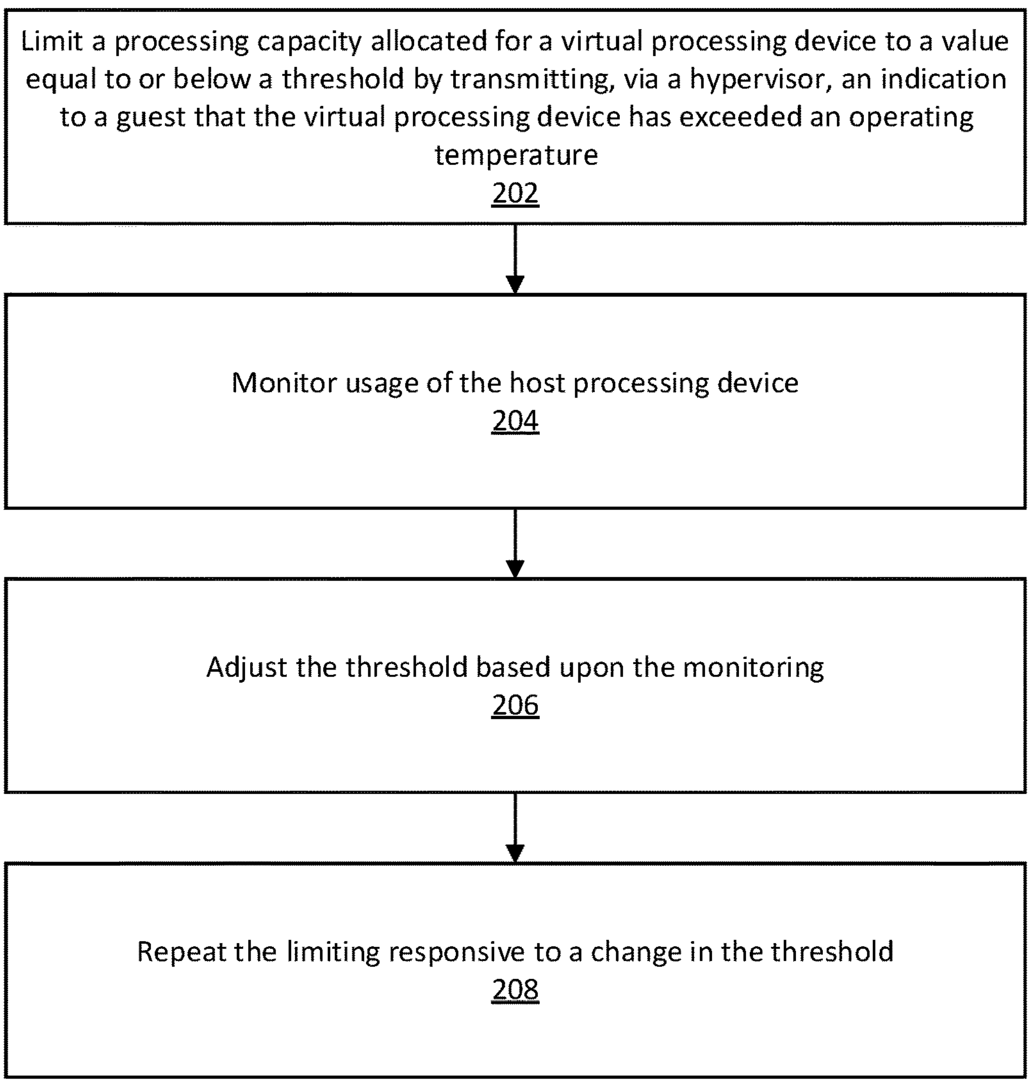

FIG. 2 illustrates a flowchart of an example method 200 for regulating virtual processing device usage, according to example embodiments of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, one or more blocks may be repeated, and some of the blocks described are optional. The method 200 may be performed by processing logic that may comprise hardware (circuitry, dedicated logic, etc.), software, or a combination of both.

At block 202, a hypervisor limits a processing capacity allocated for a virtual processing device to a value equal to or below a threshold by transmitting an indication to a guest that the virtual processing device has exceeded an operating temperature, where the value is below a current processing capacity of a host processing device. For example, a hypervisor 110 may determine that a virtual processing device 130 should be limited to a 50% capacity threshold 150 in order to avoid exceeding an unused capacity threshold 146 of a host processing device 142, then consult a lookup table 148 to determine that a temperature of 90 C is required to achieve a 50% reduction in processing rate. The hypervisor 110 may then transmit a temperature indication 170 to a guest 124 executing on the virtual processing device 130 that the virtual processing device 130 is operating at 90 C, causing the guest 124 to reduce a rate at which instructions are sent to the virtual processing device 130.

At block 204, the hypervisor monitors usage of the host processing device. For example, the hypervisor 110 may periodically request and receive capacity data from the host processing device 142. For example, the hypervisor 110 may poll the host processing device at an interval equal to or between 1 to 100 ms or 1,000 to 100,000 clock cycles.

At block 206, the hypervisor adjusts the threshold based upon the monitoring. For example, the hypervisor 110 may receive data from the host processing device 142 that indicates that the host processing device 142 is no longer operating above the unused capacity threshold 146, and may thus raise the threshold value 150 to 60%.

At block 208, the hypervisor repeats the limiting responsive to a change in the threshold. For example, the hypervisor 110 may once again consult the lookup table 148 and determine that a temperature indication 170 of 88C results in a processing rate of 60% of capacity. The hypervisor 110 may then begin sending the temperature indication 170 of 88C to the guest 124 to achieve the updated threshold value 150.

Figure 3:
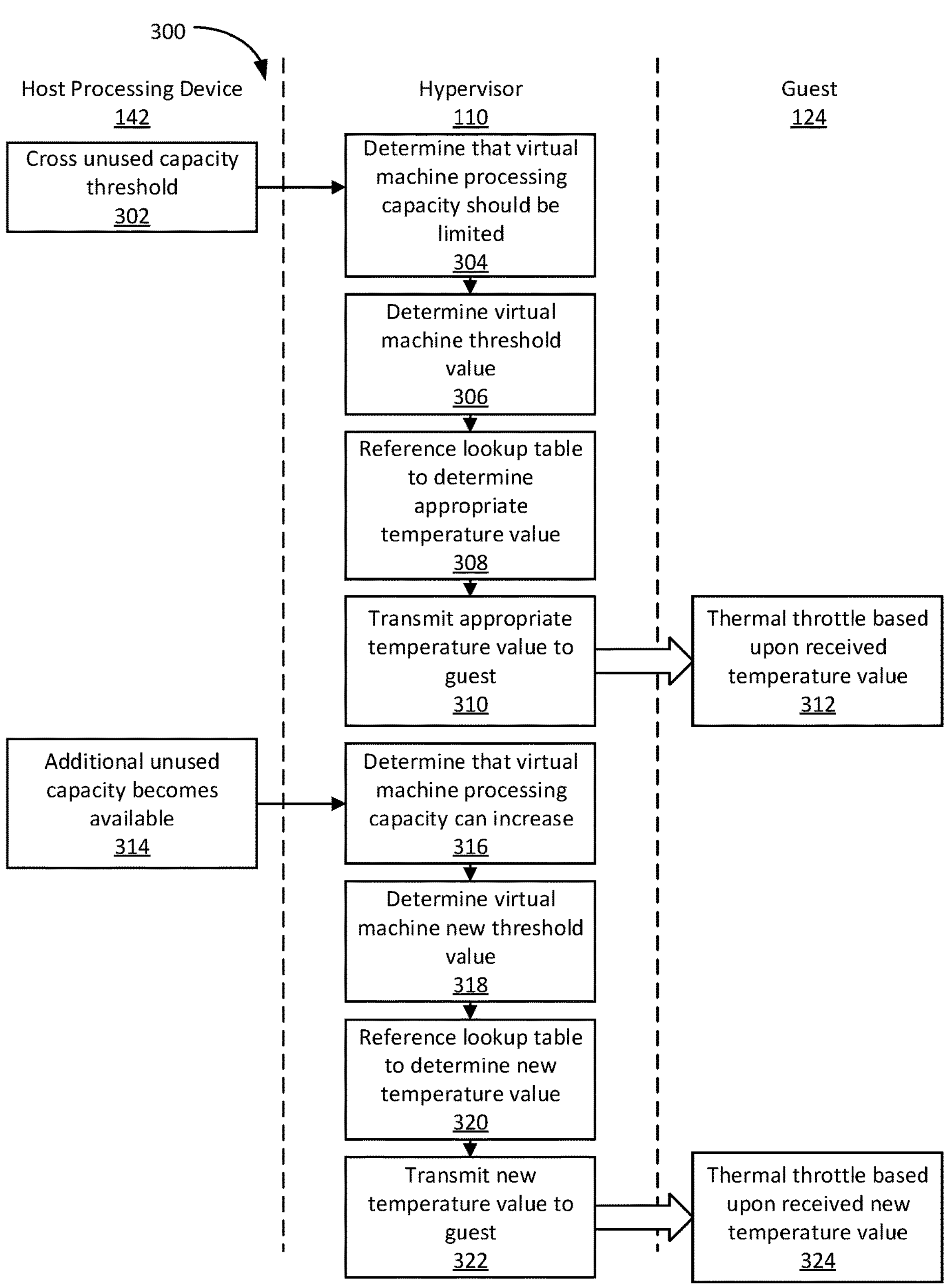
FIG. 3 illustrates a timing diagram of an example virtualized computing environment, according to example embodiments of the present disclosure.

FIG. 3 illustrates a timing diagram 300 of an example virtualized computing environment, according to example embodiments of the present disclosure. Although the example virtualized computing environment is described with reference to the timing diagram 300 illustrated in FIG. 3, it will be appreciated that many other virtualized computing environments and methods of performing the acts associated with the timing diagram 300 may be used. For example, the order of some of the blocks may be changed, certain blocks may be combined with other blocks, one or more blocks may be repeated, and some of the blocks described are optional. The acts associated with the timing diagram 300 may be performed by processing logic that may comprise hardware (circuitry, dedicated logic, etc.), software, or a combination of both.

A host processing device 142 crosses an unused capacity threshold 146 (block 302), causing a hypervisor 110 to determine that a processing rate of a virtual processing device 130 should be limited (block 304) in order to maintain an appropriate excess capacity of the host processing device 142. The hypervisor 110 then determines (block 306) a threshold value 150 (e.g. 80%) at which the processing rate should be limited in order to achieve an appropriate reduction in instructions sent to the host processing device 142. The hypervisor 110 references a lookup table 148 to determine (block 308) a temperature indication 170 value (e.g. 85 C) required to achieve the threshold value 150. Once the temperature indication 170 has been determined, the hypervisor 110 transmits the temperature indication 170 to a guest 124 (block 310). The guest 124 then thermal throttles by reducing a volume of instructions sent to an associated virtual processing device 130 by an appropriate degree (e.g. 20%) based upon the temperature indication 170 (block 312).

After some time passes, additional unused capacity of the host processing device 142 becomes available (block 314), causing the hypervisor 110 to determine (block 316) that the processing rate of the virtual processing device 130 can increase. The hypervisor 110 uses updated capacity data from the host processing device 142 to determine (block 318) a new threshold value 150 (e.g. 90%). The hypervisor 110 once again consults the lookup table 148 to determine what temperature indication 170 (e.g. 83 C) is required to achieve the new threshold value 150 (block 320). The hypervisor 110 transmits the updated temperature value 170 to the guest 124 (block 322), causing the guest 124 to increase the volume of instructions sent to an associated virtual processing device 130.

Figure 4:
FIG. 4 illustrates an example virtual processing device regulation system in operation, according to example embodiments of the present disclosure.
Figure 4:
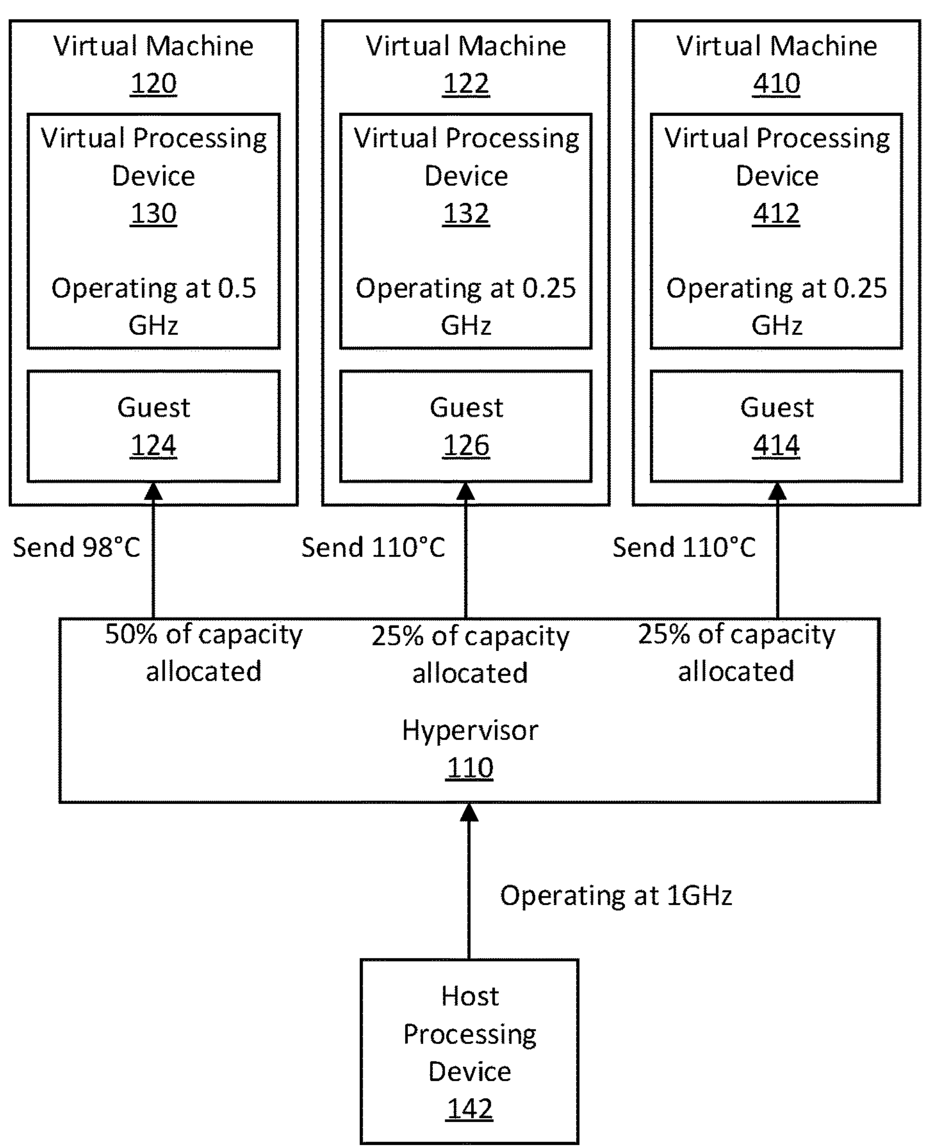

FIG. 4 illustrates an example virtual processing device regulation system 400 in operation, according to example embodiments of the present disclosure. A host processing device 142 operates at 1 GHz while executing a hypervisor 110, a first virtual machine 120, a second virtual machine 122, and a third virtual machine 410. The first virtual machine 120 includes a first virtual processing device 130 that executes a first guest 124 which is a real time guest, the second virtual machine 122 includes a second virtual processing device 132 that executes a second guest 126, and the third virtual machine 410 includes a third virtual processing device 412 that executes a third guest 414.

In this example scenario, a total processing demand of the first virtual machine 120, the second virtual machine 122, and the third virtual machine 410 is greater than an available capacity of the host processing device 142. The hypervisor 110 detects this, and utilizes priority values (see FIG. 1) associated with the first virtual machine 120, the second virtual machine 122, and the third virtual machine 410 to determine relative capacity allocations for the first virtual machine 120, the second virtual machine 122, and the third virtual machine 410. The first virtual machine 120 has a higher priority value than the second virtual machine 122 or the third virtual machine 410, and relative magnitudes of the priority values are such that the first virtual machine 120 should be allocated double a capacity which is allocated to the second virtual machine 122 or the third virtual machine 410.

The priority values may be integers assigning a prioritization rank (e.g. the first virtual machine 120 of rank 1 should be allocated approximately double the capacity of the second virtual machine 122 of rank 2 or vice versa). The priority values may alternatively be values proportional to prioritization (e.g. the first virtual machine 120 with a priority value of 0.5 should be allocated approximately double the capacity of the second virtual machine 122 with a priority value of 0.25; the first virtual machine 120 with a priority value of 2 should be allocated approximately double the capacity of the second virtual machine 122 with a priority value of 1). The priority value may be weighted with other information to determine capacity allocation ratios. For example, the hypervisor 110 may consider that the first virtual machine 120 has run more recently than the second virtual machine 122 or the third virtual machine 410 and/or that instruction volumes produced by the first virtual machine 120 are higher than those produced by the second virtual machine 122 and the third virtual machine 410 in determining a fair allotment of the host processing device 142.

Once relative processing capacity allotments have been determined, the hypervisor 110 consults a lookup table to determine temperature values for each of the first virtual machine 120, the second virtual machine 122, and the third virtual machine 410. The lookup table may be based upon specifications for a processing device being emulated by the first virtual processing device 130, the second virtual processing device 132, and/or the third processing device 412. The lookup table may alternatively be based upon known behavior of the first guest 124, the second guest 126, or the third guest 414. For example, the first guest 124 may be an instance of Red Hat Enterprise linux, which may reliably throttle the third processing device by 50% when a temperature of 98 C is detected.

In this example scenario, the hypervisor 110 determines that the first virtual machine 120 should be allocated 50% of the available capacity, corresponding to a temperature of 98 C, the second virtual machine 122 should be allocated 25% of the available capacity, corresponding to a temperature of 110 C, and the third virtual machine 410 should be allocated 25% of the available capacity, corresponding to a temperature of 110 C. The hypervisor 110 sends these temperatures to the first virtual machine 120, the second virtual machine 122, and the third virtual machine 410 respectively, causing appropriate reductions in processing rate. The hypervisor 110 then monitors available capacity of the host processing device 142 and instruction volumes of the first virtual machine 120, the second virtual machine 122, and the third virtual machine 410 to determine whether a capacity reallocation is needed.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as infrastructure processing units (IPUs), graphical processing units (GPUs), data processing units (DPUs), ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A method, comprising:

determining, by a hypervisor, a capacity threshold for a virtual processing device that prevents an unused capacity threshold of a host processing device from being exceeded;

determining, by the hypervisor accessing a lookup table, a temperature value for limiting a processing capacity allocated for the virtual processing device to a value equal to or below the capacity threshold; and limiting the processing capacity allocated for the virtual processing device to the value equal to or below the capacity threshold by transmitting, via the hypervisor, the temperature value to a guest, wherein the value is below a current processing capacity of the host processing device.

2. The method of claim 1, wherein the temperature value is based at least partially upon the capacity threshold.

3. The method of claim 1, wherein the determining, by the hypervisor, the capacity threshold for the virtual processing device is responsive to the host processing device having an unused processing capacity that is above the unused capacity threshold.

4. The method of claim 1, wherein a plurality of virtual processing devices configured to execute a plurality of guests share the host processing device, and wherein the limiting is performed for at least one virtual processing device of the plurality of virtual processing devices.

5. The method of claim 4, wherein each virtual processing device of the plurality of virtual processing devices is assigned a capacity threshold independently of other virtual processing devices.

6. The method of claim 1, wherein the capacity threshold is based at least partially upon a priority value of the virtual processing device.

7. The method of claim 1, wherein the capacity threshold is based at least partially upon a past activity of the virtual processing device.

8. The method of claim 1, further comprising:

monitoring usage of the host processing device;

adjusting the capacity threshold based upon the monitoring; and repeating the limiting responsive to a change in the capacity threshold.

9. A system, comprising:

a memory; and a processing device, operatively coupled to the memory, to:

determine, by a hypervisor, a capacity threshold for a virtual processing device that prevents an unused capacity threshold of a host processing device from being exceeded;

determine, by the hypervisor accessing a lookup table, a temperature value for limiting a processing capacity allocated for the virtual processing device to a value equal to or below the capacity threshold; and limit the processing capacity allocated for the virtual processing device to the value equal to or below the capacity threshold by transmitting, via the hypervisor, the temperature value to a guest, wherein the value is below a current processing capacity of the host processing device.

10. The system of claim 9, wherein the temperature value is based at least partially upon the capacity threshold.

11. The system of claim 9, wherein the determining, by the hypervisor, the capacity threshold for the virtual processing device is responsive to the host processing device having an unused processing capacity that is above the unused capacity threshold.

12. The system of claim 9, wherein a plurality of virtual processing devices belonging to a plurality of guests share the host processing device, and wherein the limiting is performed for at least one virtual processing device of the plurality of virtual processing devices.

13. The system of claim 12, wherein each virtual processing device of the plurality of virtual processing devices is assigned a capacity threshold independently of other virtual processing devices.

14. A non-transitory computer-readable medium containing instructions which, when executed by a processing device, cause the processing device to:

determining, by a hypervisor, a capacity threshold for a virtual processing device that prevents an unused capacity threshold of a host processing device from being exceeded;

determining, by the hypervisor accessing a lookup table, a temperature value for limiting a processing capacity allocated for the virtual processing device to a value equal to or below the capacity threshold; and limit the processing capacity allocated for the virtual processing device to the value equal to or below the capacity threshold by transmitting, via a hypervisor, the temperature value to a guest, wherein the value is below a current processing capacity of the host processing device.

15. The non-transitory computer-readable medium of claim 14, wherein the determining, by the hypervisor, the capacity threshold for the virtual processing device is responsive to the host processing device having an unused processing capacity that is above the unused capacity threshold.

* * * * *